Oct. 24, 1950     A. B. HENWOOD     2,527,420
INTERMITTENTLY HELD LEVER ACTUATED STEM
Filed April 19, 1947                                   2 Sheets-Sheet 1

Inventor
ARTHUR B. HENWOOD
By
Smith & Wells
Attorney

Oct. 24, 1950        A. B. HENWOOD        2,527,420
INTERMITTENTLY HELD LEVER ACTUATED STEM
Filed April 19, 1947        2 Sheets-Sheet 2
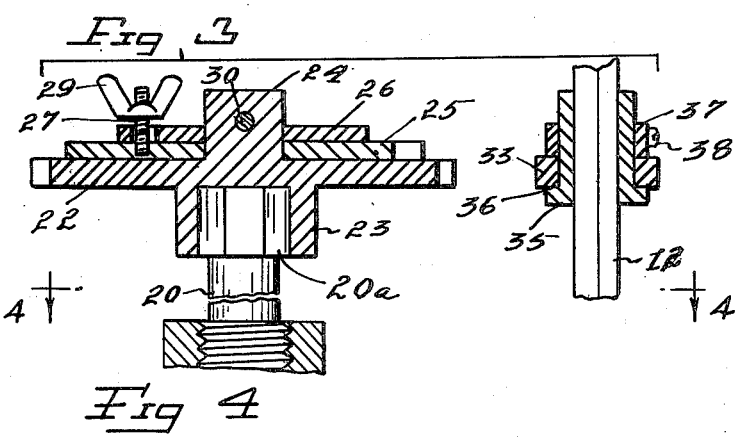
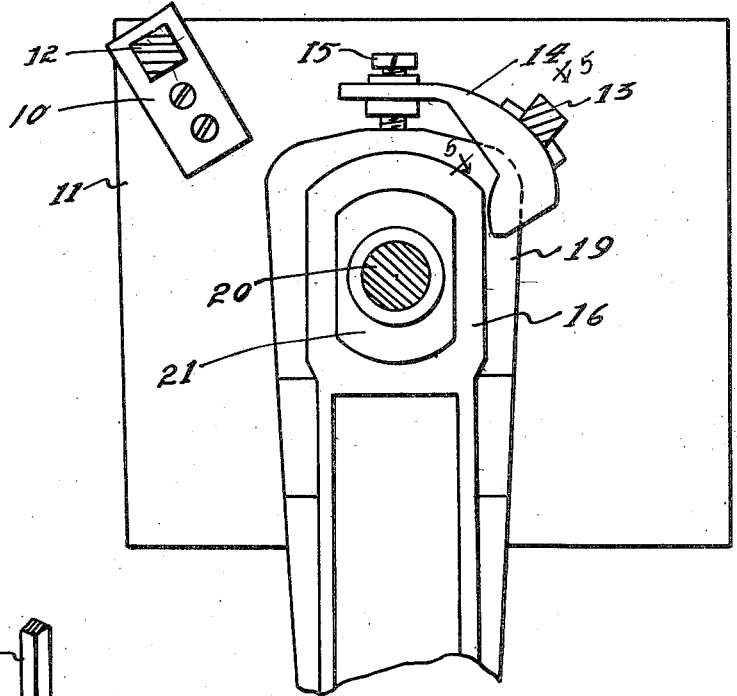
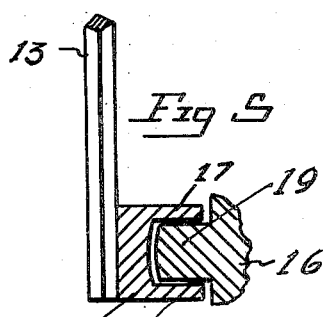
Inventor
ARTHUR B. HENWOOD
By Smith & Wells
Attorney Patented Oct. 24, 1950

2,527,420

UNITED STATES PATENT OFFICE 2,527,420

INTERMITTENTLY HELD LEVER ACTUATED STEM

Arthur B. Henwood, Kellogg, Idaho

Application April 19, 1947, Serial No. 742,555

4 Claims. (Cl. 74—142)

My invention relates to improvements in an intermittently held lever actuated stem.

The invention is applied to lubricators of plug valves of the type shown in the patent to Pierce, 2,057,343, for Valve Lubricating Device, granted October 13, 1936. In these valves lubrication is accomplished by means of a lubricant chamber in the valve stem connected by suitable passages to the bearing faces of the valve. The chamber is threaded to receive a pressure member that has a stem with a head that is adapted to receive a wrench or a turning mechanism, such as is shown by Pierce to advance the pressure member and force the lubricant from the chamber.

It is the purpose of my invention to provide an improved attachment for valves of this character for automatically advancing the pressure member, as the valve is operated, an amount determined by the adjustment of the attachment. According to my invention the parts of the attachment may readily be applied to and removed from a valve having the lubricating means above referred to.

The novel features that I consider characteristic of my invention are set forth with particularity in the claims. The invention itself, however, both as to its organization and its method of operation, together with additional objects and advantages thereof, will be understood from the description of a specific embodiment when read in connection with the accompanying drawings, in which:

Figure 3 is a fragmentary sectional view taken on the line 3—3 of Figure 2;

Figure 4 is a plan sectional view taken substantially on the line 4—4 of Figure 3;

Figure 5 is a fragmentary sectional view taken on the line 5—5 of Figure 4.

Figure 1:
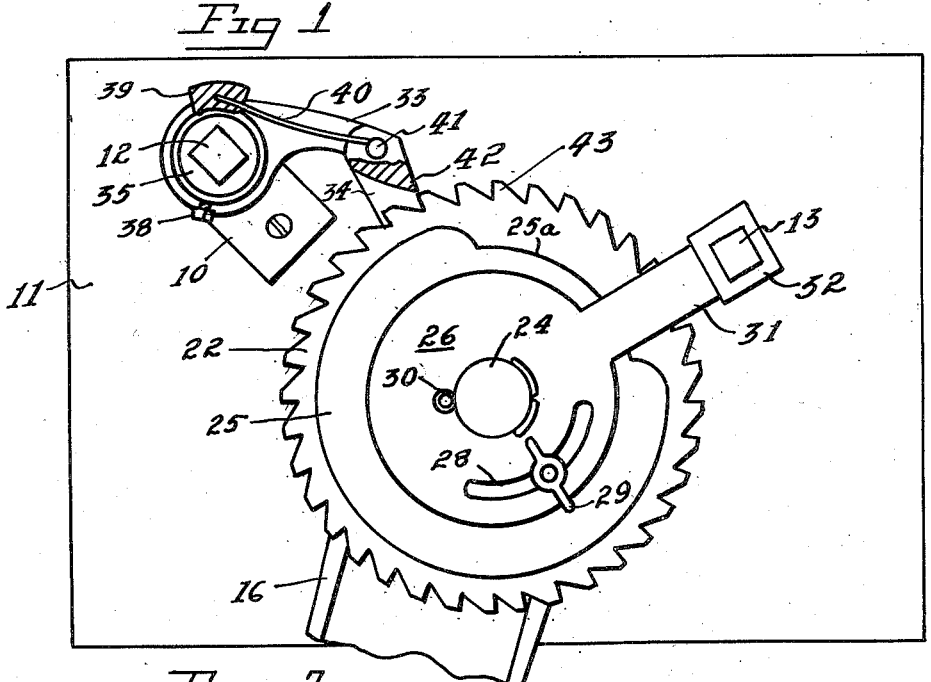
Figure 1 is a plan view of my attachment showing it mounted on a plug valve base.

Referring now to the drawings and particularly to Figures 1 and 4, in order to mount my attachment on an existing valve I provide a bracket 10 for mounting on the valve plug 11 and support a square bar 12 on the bracket. Another square bar 13 is mounted by means of a yoke 14 and a set screw 15 on the valve handle 16. The set screw 15 may desirably be the usual set screw employed, if it is long enough and, if not, a longer set screw may be used to mount the yoke 14. The yoke is forked as indicated at 17 and 18 in Figure 5 so as to receive the rib 19 of the valve handle.

As pointed out in the early description the valve lubricating system is actuated by a pressure member which has a stem 20 that projects upwardly from the valve stem 21. My attachment introduces a ratchet wheel 22 which has a socket 23 thereon to receive the head 20a on the stem 20 of the pressure member. Since the valve itself and the pressure member are well known in the art as illustrated in the Pierce patent, I have made no showing of the details of the valve or of the lubricating system. The necessary operation to effect lubrication of the valve is the rotation of the stem 20 of the pressure member in the proper direction. In some cases it may be desirable to rotate the stem on the valve closing movement of the handle 16 while in other cases it may be desirable to advance the pressure member on the valve opening movement of the handle 16. It is a simple matter to adapt my attachment to either type of movement.

The ratchet wheel 22 has a cylindrical projection 24 opposite the socket 23 to mount thereon a cam 25. Also over the cam I provide an adjusting plate 26 that is centered on the projection 24. The cam 25 can turn between the adjusting plate and the ratchet wheel, however, it is clamped in adjusted position to the plate 26 by a screw 27 riding in a slot 28 of the plate 26, and a wing nut 29. A suitable pin 30 is used to hold the cam and the plate on the ratchet wheel.

The plate has an arm 31 extended therefrom and provided with a head portion 32 that fits over the square bar 13. The head 32 can slide up and down on the bar 13 but must otherwise travel with the bar 13 when the bar is turned about the axis of the stem 20 by operation of the handle 16.

A pawl 33 is mounted on the rod 12 and has a forked end 34 receiving the ratchet wheel. The pawl is pivotally mounted on a sleeve 35 that slides up and down on the bar 12. The sleeve has a shoulder 36 on which the pawl is supported. A collar 37 fits over the pawl 33 and is secured against rotation on the sleeve 35 by a set screw 38. The collar 37 has an ear 39 thereon to which one end of a spring 40 is fixed. The other end of the spring 40 is secured to a pin 41 near the free end of the pawl. The spring is so mounted that it tends to force the pawl towards the ratchet wheel in order to engage the pawl tip 42 with the teeth 43 of the wheel.

Figure 2:
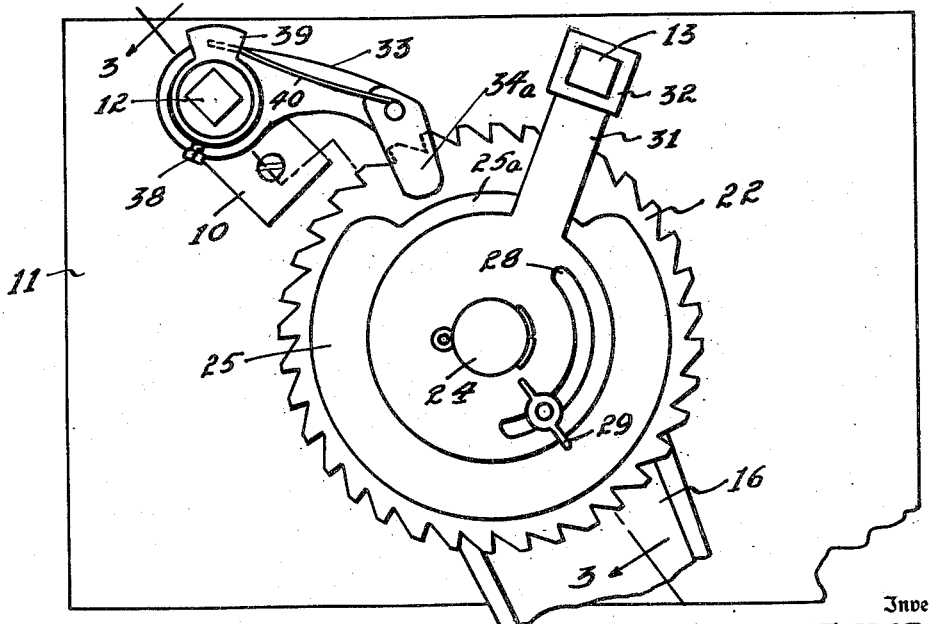
Figure 2 is a view similar to Figure 1 but showing the parts in a changed position.

The upper bifurcation 34a of the pawl is positioned to engage the cam 25 as illustrated in Figures 1 and 2 when the large part of the cam is moved to a position opposite the pawl. However, when the narrower portion 25a of the cam is opposite the pawl the teeth of the ratchet wheel will be engaged by the pawl so as to hold the ratchet wheel against turning with the plate 26 as it is turned by turning the handle 16. It is evident that by adjusting the position of the cam 25 with respect to the plate 26 the amount of movement of the ratchet wheel with respect to the plate 26 for each quarter turn of the valve handle 16 can be adjusted to suit the needs for lubrication of a particular valve. The device has the advantage that as the valve is used and the pressure member 20 is advanced further down into the valve stem the head 32 and the sleeve 35 slide on their respective rods to maintain the parts and the proper working condition. It is a simple matter to lift the attachment off of the head of the pressure member whenever the pressure member has to be removed to refill the lubricating chamber.

It is believed that the nature and advantages of the invention will be clear from the foregoing description. Having thus described my invention, I claim:

1. In a device of the character described having a stem rotatable in opposite directions and a second stem projecting axially from the first named stem and rotatable, a stationary bar adjacent to and parallel with said stems, a second bar fixed to the first named stem and spaced therefrom and parallel with the first named bar, a ratchet wheel mounted on the second stem, a cam rotatably associated with said ratchet wheel, a member secured to said cam and slidable lengthwise on said second bar and a spring pressed pawl slidable lengthwise on the first named bar, said pawl having bifurcations at its free end fitting over the periphery of the ratchet wheel, one bifurcation bearing on the cam, and the pawl having a tooth between the bifurcations for engaging the teeth of the ratchet wheel.

2. In a device of the character described, means for causing the alternate turning of one stem in opposite directions to effect a variable turning of another stem, which is threaded therein, and projects axially therefrom, in one direction only, said means comprising a ratchet wheel nonrotatably seated on the projecting end of the second stem, a cam rotatably mounted with respect to said projecting end, an arm also rotatably mounted with respect to said projecting end and angularly adjustable with respect to the cam, a stationary bar parallel to the stems, a pawl slidable lengthwise of said bar and spring pressed toward said ratchet wheel, the pawl having a portion positioned to engage the cam and disengage the pawl from the ratchet wheel, and a guide bar on said first named stem to which said arm is slidably secured.

3. In a device of the character described, means for causing the alternate turning of one stem in opposite directions to effect a variable turning of another stem, which is threaded therein, and projects axially therefrom, in one direction only, said means comprising a ratchet wheel nonrotatably seated on the projecting end of the second stem, said ratchet wheel having a central projection, a cam rotatably mounted on said projection, an arm resting on said cam and angularly adjustable with respect thereto, a stationary bar parallel to the stems, a pawl slidable lengthwise of said bar and spring pressed toward said ratchet wheel, the pawl having a portion positioned to engage the cam and disengage the pawl from the ratchet wheel, and a guide bar on said first named stem to which said arm is slidably secured.

4. In a device of the character described, means for causing the alternate turning of one stem in opposite directions to effect a variable turning of another stem, which is threaded therein, and projects axially therefrom, in one direction only, said means comprising a polygonal head on the second stem, a ratchet wheel having a socket receiving said head, a cam rotatably mounted on the ratchet wheel, a stationary bar parallel to said stems, a pawl slidable on said bar and engaging the ratchet wheel and having a portion riding on the cam, a bar fixed to the first named stem and parallel thereto, and a cam holder secured to the cam and slidable on the last named bar, whereby the ratchet wheel, cam, cam holder and pawl may be lifted off said stems and bars.

ARTHUR B. HENWOOD.

REFERENCES CITED

The following references are of record in the file of this patent:

UNITED STATES PATENTS

| Number | Name | Date |
|---|---|---|
| 1,296,870 | Sohm | Mar. 11, 1919 |
| 2,057,343 | Pierce | Oct. 13, 1936 |
| 2,265,526 | Henderson | Dec. 9, 1941 |
| 2,323,421 | Reed | July 6, 1943 |
| 2,363,683 | Mallina | Nov. 28, 1944 |
| 2,431,299 | Pochek | Nov. 18, 1947 |

FOREIGN PATENTS

| Number | Country | Date |
|---|---|---|
| 82,834 | Switzerland | Oct. 16, 1919 |
| 486,385 | Great Britain | June 2, 1938 |